US012613585B2

(12) United States Patent
Heinzl et al.

(10) Patent No.: US 12,613,585 B2
(45) Date of Patent: Apr. 28, 2026

(54) BARCODE READER WITH MOTION-BASED TRIGGERING

(71) Applicant: NIMMSTA GMBH, Aßling (DE)

(72) Inventors: Stefan Heinzl, Emmering (DE); Stefan Richter, Pfaffing (DE); Andreas Funkenhauser, Aßling (DE); Florian Ruhland, Erding (DE)

(73) Assignee: NIMMSTA GmbH, Munich (DE)

( * ) Notice: Subject to any disclaimer, the term of this patent is extended or adjusted under 35 U.S.C. 154(b) by 0 days.

(21) Appl. No.: 19/219,760

(22) Filed: May 27, 2025

(65) Prior Publication Data

US 2025/0362756 A1 Nov. 27, 2025

(30) Foreign Application Priority Data

May 27, 2024 (DE) .......................... 102024114853.5

(51) Int. Cl.
*G06F 3/01* (2006.01)
*G06F 3/0346* (2013.01)
*G06K 7/14* (2006.01)

(52) U.S. Cl.
CPC .............. *G06F 3/017* (2013.01); *G06F 3/014* (2013.01); *G06F 3/0346* (2013.01); *G06K 7/1413* (2013.01)

(58) Field of Classification Search
CPC ........ G06F 3/017; G06F 3/014; G06F 3/0346; G06K 7/1413
USPC .................................................... 235/462.01
See application file for complete search history.

(56) References Cited

U.S. PATENT DOCUMENTS

| | | | |
|---|---|---|---|
| 11,954,556 B1 * | 4/2024 | Fracassi ............. | G06K 7/10396 |
| 2010/0063794 A1 * | 3/2010 | Hernandez-Rebollar .................... | |
| | | | G06V 40/28 |
| | | | 704/271 |
| 2011/0290889 A1 | 12/2011 | Tamburrini et al. | |
| 2012/0111942 A1 | 5/2012 | Liu | |
| 2016/0161301 A1 * | 6/2016 | Guenther ................. | G07C 1/00 |
| | | | 702/150 |
| 2017/0059867 A1 | 3/2017 | Tanaka et al. | |
| 2019/0295025 A1 | 9/2019 | Hyodo et al. | |
| 2021/0089734 A1 * | 3/2021 | Toumazou ............ | G06F 1/1684 |
| 2023/0334274 A1 * | 10/2023 | Fountain ................ | H01Q 1/273 |
| 2024/0358102 A1 * | 10/2024 | Kettner ................ | A41D 19/015 |

FOREIGN PATENT DOCUMENTS

DE 202020100866 U1 7/2020

* cited by examiner

*Primary Examiner* — Daniel A Hess
(74) *Attorney, Agent, or Firm* — Wolf, Greenfield & Sacks, P.C.

(57) ABSTRACT

Barcode scanner comprising at least one reading head unit and means for attaching the at least one reading head unit to a user's hand and/or arm, as well as a control unit and an acceleration sensor that measures the accelerations occurring during movement of the hand (whether the hand alone or the hand with the arm), wherein the barcode scanner is configured to activate the reading head unit for scanning as soon as the scanner detects an acceleration that exceeds a first threshold acceleration, and a subsequent first resting phase during which the hand is essentially still.

20 Claims, 2 Drawing Sheets

BARCODE READER WITH MOTION-BASED TRIGGERING

CROSS-REFERENCE TO RELATED APPLICATIONS

This application claims priority to and the benefit under 35 U.S.C. § 119(a)-(d) of German Patent Application No. 102024114853.5, filed May 27, 2024.

FIELD OF THE INVENTION

The invention relates to a barcode scanner and a method for its operation.

TECHNICAL BACKGROUND

The use of barcode scanners is widespread.

Originally, barcode scanners were mainly used as hand-held devices with which the objects to be detected were directly scanned one after the other.

Especially in situations where the barcode scanner needs to be used not just temporarily but must be continuously available—such as in automotive manufacturing in the assembly lines to document that the correct parts have been installed—barcode scanners worn on the back of the hand are now commonly used. These allow the user to keep both hands free without having to set the barcode scanner down somewhere in between.

To perform scanning, hand-mounted scanners have so far been triggered either by touching their touchscreen or by pressing a trigger button. Such a trigger button is often placed on the side of the index finger and then operated with the thumb.

Problem

Especially in situations where the barcode of many goods needs to be captured at short intervals, two problems arise.

Triggering the scanner via its touchscreen is too time-consuming for mass scanning.

Triggering the scanner by pressing an ergonomically well-positioned trigger button is generally very fast. However, this carries the risk that the user may quickly develop a condition commonly referred to as "mouse hand": frequent pressing of the trigger button on the index finger with the thumb can strain the thumb's tendons or even lead to carpal tunnel syndrome.

Dispensing with a dedicated trigger mechanism and keeping the scanner's reading head constantly ready to capture a barcode is not practical, as this causes the scanner's battery to drain too quickly.

As an alternative, it has often been proposed to trigger the scanner by having the user perform a specific movement with the device. However, to prevent unintentional activation by everyday movements, the motion required to trigger the device must be relatively specific. As well this technology has not yet gained widespread acceptance, as the problem remains that the intended triggering movement is often not reliably detected. The user is then faced with having to repeat the triggering movement at regular intervals, which quickly becomes annoying because it disrupts the workflow.

Object of the Invention

In contrast, the task of the invention is to provide a scanner that is triggered by a movement that is very easy to learn, without causing significant false activations.

SUMMARY OF THE INVENTION

As a solution, a barcode scanner is proposed.

This barcode scanner has at least one reading head unit. It includes means for attaching this at least one reading head unit to a user's hand or arm, preferably on the back of the hand and/or on a finger of the hand.

In addition, the barcode scanner according to the invention has a control unit and an acceleration sensor.

The reading head unit, the control unit, the acceleration sensor, and the optional gyroscope are preferably all integrated into a common housing, which is ideally attached to the back of the user's hand—using a grip loop or, better yet, by means of a partial or full glove or a fingerless sleeve. Alternatively, different partial housings may also be used. The latter can then be attached, for example, to the forearm or to a finger using a ring and may if given communicate wirelessly with one another.

Optionally one of the known activation buttons can still be provided, which the user may operate, especially when dealing with only a low scan volume and therefore prefers to activate the reading head in a conventional manner.

The acceleration sensor measures the accelerations that occur during hand movement.

The invention is characterized in that the barcode scanner is configured to activate the reading head unit for scanning as soon as the scanner detects an acceleration that exceeds a first threshold acceleration and subsequently detects a first resting phase during which the user's hand is completely, or at least essentially, still. This first resting phase is optionally at least 0.175 seconds long, in some cases at least 0.2 seconds, and occasionally even at least 0.75 seconds long, but should generally not exceed 1.0 second.

Thus, the trigger is not based on mere acceleration, but on a type of motion pattern. This pattern consists of an acceleration that exceeds a predetermined threshold, followed—usually almost immediately and typically abruptly within a fraction of a second, which is generally shorter than the resting phase itself—by a first resting phase. Such a motion pattern is typical for a scan process intended by the user. This is because the user swings his hand relatively quickly from the previous position into a position in which the reading head unit mounted on the back of the hand is approximately aligned with the barcode to be scanned.

The user then suddenly holds still to allow the reading head unit to detect the barcode to be illuminated. Such an abrupt transition from a very rapid movement to a resting phase occurs only relatively rarely in the general course of motion when no scan is intended. This is because abrupt hand movements not motivated by the intent to scan are typically followed by further movements of diminishing intensity before eventually a resting phase occurs.

The invention thus eliminates the need to learn and perform a specific movement to activate the scanner, which would then have to be followed by aligning it with the label to be scanned containing the barcode before the actual scanning process could begin. Instead, the core of the invention lies in recognizing when the user is about to align the reading head with the barcode to be scanned and then activating the reading head. This achieves a particularly reliable activation of the reading head. Moreover, the user also saves time, since there is often no need to perform a separate, potentially time-consuming movement solely to activate the reading head.

DETAILED DESCRIPTION OF THE INVENTION

Figure 1:
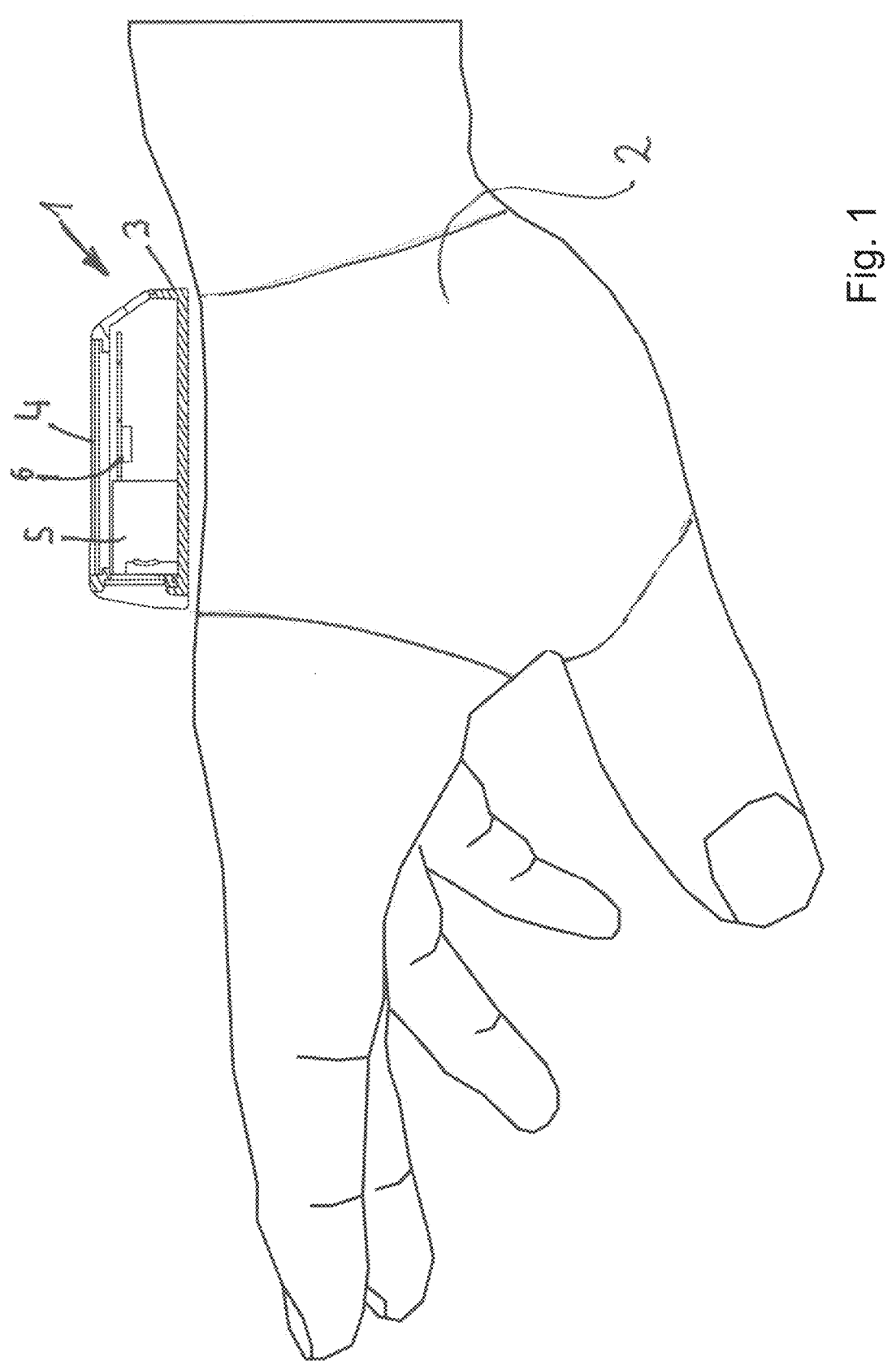
FIG. 1 schematically shows a barcode scanner according to the invention.

In practice, cases frequently arise in which not just one barcode must be detected, but instead a whole series of barcodes must be read sequentially—for example, when a large number of packages are issued at once at a goods dispatch station.

It would be extremely tiring for the user of the barcode reader if they had to perform a strong movement ten times to trigger the barcode scanner for each individual scanning process.

It is therefore preferred that the barcode scanner is configured to activate the reading head for scanning again whenever a first scan process has already been triggered by a sufficiently strong movement followed by a first resting phase and has been successfully processed. This reactivation occurs when, within a defined sequence time, the trigger detects an acceleration exceeding at least a second threshold acceleration, which is lower than the first threshold acceleration, and subsequently detects a second resting phase in which the hand is essentially still. This configuration is based on the recognition that during series of scans, movements occur between individual scan processes, but these are neither particularly abrupt nor strong. The user of the scanner simply moves their hand slightly to reach the next package to be exposed. Then they hold still again to allow the reading head to detect the barcode printed on the respective label.

In this way, series of scans can be carried out quickly and with minimal danger of fatigue.

Such a series of scans can be continued with ease.

It only ends when either no further motion event can be detected after the last scan, or a motion event is detected, but its duration exceeds—more than insignificantly—the amount of time normally required to align the reading head from one barcode to the next one to be read, such that no second or further resting phase occurs within the expected time interval. If this is the case, the reading head, due to the scanner's corresponding configuration, will only become active again once the first, higher threshold acceleration is exceeded and a subsequent first resting phase is detected.

It makes sense to equip the barcode scanner so that the value of the first threshold acceleration can be adjusted by the user. Ideally, the barcode scanner is equipped with a touchscreen that allows the user to input the corresponding settings.

Such an option to configure the threshold acceleration enables the user to begin working with a relatively high initial setting for the first threshold acceleration. As a result, he is initially confronted with very few false activations. This gives him the impression from the start that the device is easy to use, which in turn increases acceptance. As the user gains more experience with how the gesture-controlled barcode scanner responds, he can then lower the first threshold acceleration setting. This allows him to operate the barcode scanner even more effortlessly than before, while their growing experience ensures that they do not encounter an increased number of false activations.

The same principle applies to the user's ability to adjust the second threshold acceleration according to his preference. Especially during extensive series of scans, the user can lower the second threshold acceleration to a level where the reading head is reliably triggered again after only a very small movement followed by a brief pause. Even if this saves only fractions of a second per scan process, the time savings become clearly noticeable when, for example, a series of scans of 50 barcodes must be performed. Conversely, another user who rarely must carry out series of scans has the option of keeping the second threshold acceleration set high to reliably prevent a second scan attempt from being mistakenly triggered after the first.

It is particularly advantageous if the respective threshold acceleration can be set by enabling the barcode scanner to be trained. For this purpose, a corresponding movement made by the user is recorded by the barcode scanner and then stored as a reference. In this way, the user can very comfortably determine the threshold acceleration required for triggering—by performing a movement they naturally prefer. This also significantly increases user acceptance.

In practice, it has been shown that the first threshold acceleration should generally not fall below 0.65 g, preferably not below 0.8 g. If this threshold is undercut, the number of false activations tends to increase significantly. The same principle applies analogously to the second threshold acceleration. In this context, a value lower than the first threshold acceleration, often a minimum of 0.45 g or preferably 0.6 g, has proven to be a practically effective lower limit.

To specifically accelerate mass scanning, it is advantageous to configure the minimum duration of the first resting phase—required for it to be accepted as such—to be longer than the minimum duration of the second resting phase. This is because, following the first scan process, the typical subsequent scan steps of a mass scanning can be clearly identified. For this reason, during follow-up scans, a relatively short pause in movement is usually sufficient to confidently assume that the user has aligned their hand with the scanner on the next barcode. If necessary, it is also possible not only to differentiate between a first and second resting phase, but to define additional subsequent resting phases, which may become progressively shorter.

In this context as well, it can be beneficial to configure the barcode scanner so that the user can adjust the length of the first and/or second resting phases according to their own preferences, to achieve a gesture-based triggering process that feels both reliable and time-efficient.

It can be particularly advantageous to additionally equip the barcode scanner with a gyroscope. The gyroscope can complement the function of the acceleration sensor.

When a gyroscope is used, the barcode scanner can be configured in such a way that a certain, even high, acceleration is only interpreted as an exceedance of the first threshold acceleration if the gyroscope simultaneously detects a specific first type of hand movement—for example, a back-and-forth rotational movement of the hand essentially around the longitudinal axis of the forearm, or a tilting movement of the hand around the wrist.

A barcode scanner developed in this way can, for example, be operated immediately and with high reliability even by untrained individuals. This makes it easier for jumping workers, who only occasionally work at the respective assembly line or shipping workstation, to work particularly effectively from the outset.

It can also be useful to involve the gyroscope in the detection of the second threshold acceleration. In this case, a certain acceleration—although technically sufficient—is only interpreted as exceeding the second threshold if the gyroscope detects a specific second type of hand movement, such as a predominantly translational hand movement. Additionally, a magnetic field sensor can be used to compensate for the Earth's gravity and to achieve further refinements. The magnetic field sensor and the gyroscope are usually algorithmically linked in this setup.

Preferred Embodiment

FIG. 1 shows a preferred embodiment of a barcode scanner 1 according to the invention. As shown, it can be attached to a glove-like cuff 2 and held on the back of the hand with its help. The version shown here features all components arranged within a single housing 3. This is advantageous, though not strictly necessary, as previously described.

The housing is equipped with a top-mounted touchscreen 4. The reading head unit 5 is also clearly visible. In addition, there is a CPU 6, which handles all data processing required for operation, evaluating and correlating the measured data from the gyroscope (not shown in detail here) and the acceleration sensor (also not shown).

Also not shown are the battery and the conductor loop, which is included in the housing in many cases to allow for wireless, inductive charging of the battery.

Lastly, regarding the attachment method and the design of housing 3 on the glove, as well as the type, positioning, and mounting of the optionally included secondary trigger that may serve as an alternative additional activation means, reference is made to the earlier utility model DE 20 2020 100 866 U1 held by the applicant, the disclosure of which is hereby incorporated in full into this application.

Figure 2:
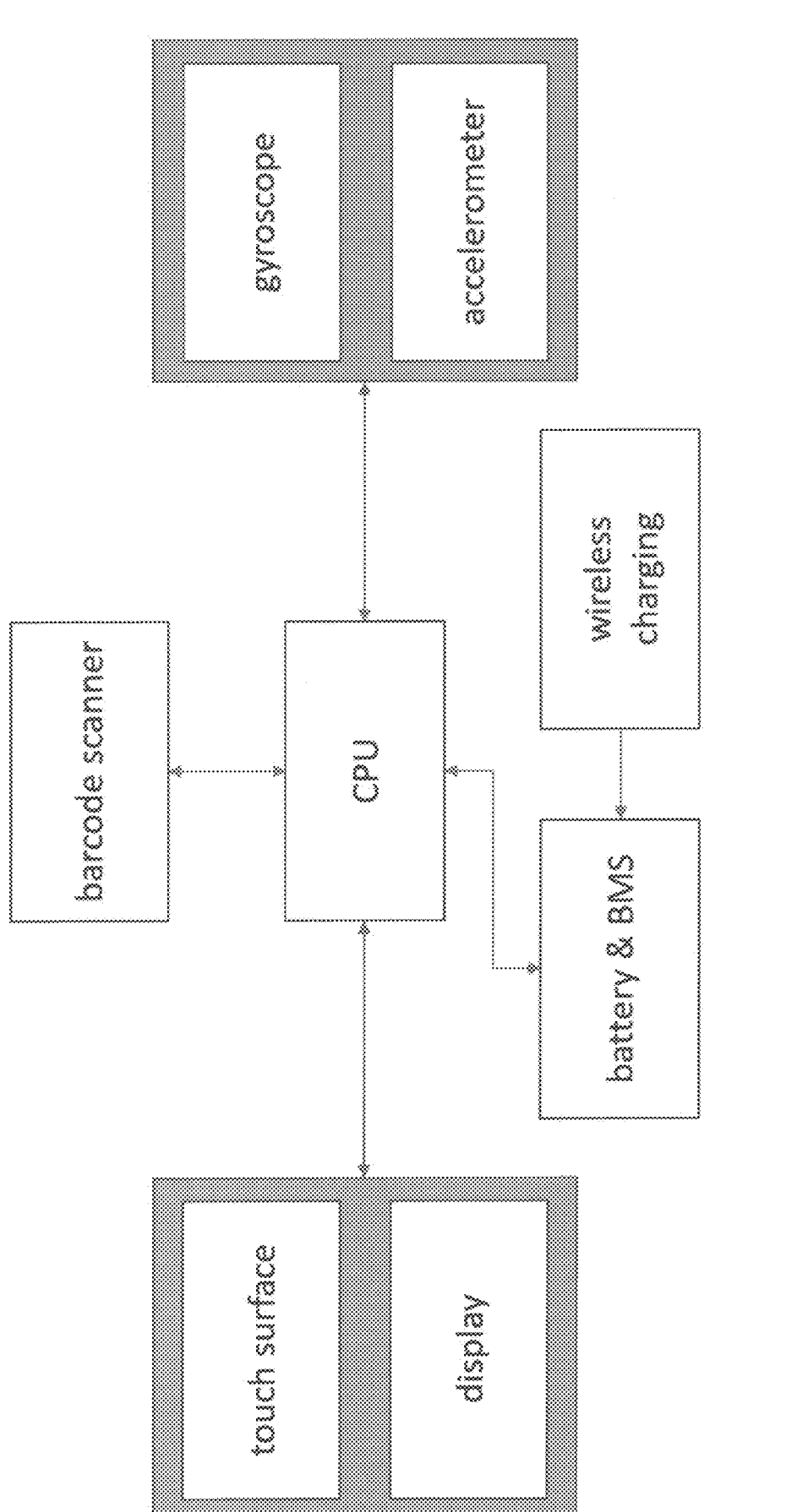
FIG. 2 provides an overview of the basic internal structure of the barcode scanner shown in the preferred embodiment.

FIG. 2 schematically shows the internal structure of the barcode scanner 1.

The invention claimed is:

1. A barcode scanner comprising:
at least one reading head unit;
means for attaching the at least one reading head unit to a user's hand and/or arm;
a control unit; and
an acceleration sensor that measures accelerations occurring during movement of the user's hand, whether the user's hand moves alone or the user's hand moves with the arm, wherein the barcode scanner is configured to activate the at least one reading head unit for scanning as soon as the barcode scanner detects an acceleration that exceeds a first threshold acceleration and a first resting phase during which the user's hand is essentially still.

2. The barcode scanner according to claim 1, wherein the barcode scanner is configured to activate the at least one reading head unit for scanning again after a scanning process when, within a defined follow-up time, the barcode scanner detects an acceleration that exceeds a second threshold acceleration, which is lower than the first threshold acceleration, and a subsequent second resting phase during which the user's hand is essentially still.

3. The barcode scanner according to claim 2, wherein the barcode scanner is configured to continuously activate the at least one reading head unit for scanning after the scanning process, as long as the barcode scanner detects, within the defined follow-up time, an acceleration that exceeds the second threshold acceleration and a subsequent further or second resting phase during which the user's hand is essentially still.

4. The barcode scanner according to claim 2, wherein a value of the first threshold acceleration and/or a value of the second threshold acceleration can be set by the user of the barcode scanner using a training process during which the user of the barcode scanner performs a movement that is used as a reference movement to determine and store a numerical value of the first or second threshold acceleration.

5. The barcode scanner according to claim 2, wherein the second threshold acceleration is not less than 0.45 g in absolute value.

6. The barcode scanner according to claim 2, wherein the first resting phase is longer than the second resting phase and optionally additional resting phases.

7. The barcode scanner according to claim 2, wherein a duration of the first and/or the second resting phase can be set by the user of the barcode scanner.

8. The barcode scanner according to claim 2, wherein the barcode scanner additionally comprises a gyroscope and is configured such that, upon exceeding the second threshold acceleration, the barcode scanner only activates the at least one reading head unit for scanning if the gyroscope detects a specific second type of hand movement.

9. The barcode scanner according to claim 8, wherein the specific second type of hand movement corresponds predominantly to a translational hand movement.

10. The barcode scanner according to claim 1, wherein the first threshold acceleration is not less than 0.65 g in absolute value.

11. The barcode scanner according to claim 1, wherein the barcode scanner additionally comprises a gyroscope and is configured such that, upon exceeding the first threshold acceleration, the barcode scanner only activates the at least one reading head unit for scanning if the gyroscope detects a specific first type of hand movement.

12. The barcode scanner according to claim 11, wherein the specific first type of hand movement is essentially a rotation of the user's hand around a longitudinal axis of the user's forearm and/or a tilting movement of the user's hand at the wrist.

13. A method for operating the barcode scanner according to claim 1, wherein the occurrence of an acceleration greater than the first threshold acceleration is used as a triggering criterion for a first scan process, but only if the acceleration is followed essentially immediately by a first resting phase.

14. The method according to claim 13, wherein the occurrence of an acceleration greater than a second threshold acceleration is used as a triggering criterion for a second scan process following the first scan process, but only if the acceleration is followed essentially immediately by a second resting phase.

15. The method according to claim 14, wherein a value of the first threshold acceleration and/or a value of the second threshold acceleration is set by the user of the barcode scanner using a training process during which the user of the barcode scanner performs a movement that is used as a reference movement to determine and store a numerical value of the first or second threshold acceleration.

16. The method according to claim 14, wherein the user of the barcode scanner sets a duration of the first and/or the second resting phase.

17. The method according to claim 14, wherein the barcode scanner additionally comprises a gyroscope and is configured such that, upon exceeding the second threshold acceleration, barcode scanner only activates the at least one reading head unit for scanning if the gyroscope detects a specific second type of hand movement.

18. The method according to claim 17, wherein the specific second type of hand movement corresponds predominantly to a translational hand movement.

19. The method according to claim 13, wherein the barcode scanner additionally comprises a gyroscope and is configured such that, upon exceeding the first threshold acceleration, the barcode scanner only activates the at least one reading head unit for scanning if the gyroscope detects a specific first type of hand movement.

20. The method according to claim 19, wherein the specific first type of hand movement is essentially a rotation of the user's hand around a longitudinal axis of the user's forearm and/or a tilting movement of the user's hand at the wrist.

\* \* \* \* \*